(12) United States Patent
Albesa

(10) Patent No.: US 11,934,529 B2
(45) Date of Patent: Mar. 19, 2024

(54) PROCESSING DEVICE AND METHOD FOR SECURED BOOT

(71) Applicant: STMicroelectronics (Grand Ouest) SAS, le Mans (FR)

(72) Inventor: Franck Albesa, Parigne l'eveque (FR)

(73) Assignee: STMICROELECTRONICS (GRAND OUEST) SAS, Le Mans (FR)

( * ) Notice: Subject to any disclaimer, the term of this patent is extended or adjusted under 35 U.S.C. 154(b) by 64 days.

(21) Appl. No.: 17/822,272

(22) Filed: Aug. 25, 2022

(65) Prior Publication Data

US 2023/0069651 A1 Mar. 2, 2023

(30) Foreign Application Priority Data

Aug. 26, 2021 (FR) ...................................... 2108928

(51) Int. Cl.
*G06F 21/57* (2013.01)
*G06F 9/30* (2018.01)
*H03K 21/38* (2006.01)

(52) U.S. Cl.
CPC ........ *G06F 21/575* (2013.01); *G06F 9/30003* (2013.01); *G06F 21/57* (2013.01); *H03K 21/38* (2013.01)

(58) Field of Classification Search
CPC .... G06F 21/57; G06F 21/575; G06F 9/30003; H03K 21/38
See application file for complete search history.

(56) References Cited

U.S. PATENT DOCUMENTS

| 8,184,812 | B2 | 5/2012 | Margoilis et al. |
| 10,659,054 | B2 | 5/2020 | Werner et al. |
| 10,868,679 | B1 | 12/2020 | Van Antwerpen et al. |
| 2006/0090084 | A1 | 4/2006 | Buer |
| 2006/0198515 | A1 | 9/2006 | Forehand et al. |
| 2012/0102313 | A1* | 4/2012 | Nicolson ............... H04L 63/123 713/2 |
| 2014/0310535 | A1* | 10/2014 | Sibert ................... G06F 21/572 713/193 |
| 2019/0286823 | A1 | 9/2019 | Walrant |
| 2021/0406381 | A1* | 12/2021 | Heisrath ............... H04L 63/108 |
| 2022/0294644 | A1 | 9/2022 | Liu et al. |
| 2022/0318392 | A1 | 10/2022 | Albesa et al. |

FOREIGN PATENT DOCUMENTS

WO 2019239121 A1 12/2019

OTHER PUBLICATIONS

Sarmenta, Luis F., et al., "Virtual Monotonic Counters and Count-Limited Objects using a TPM without a Trusted OS", STC'06, Nov. 3, 2006, US, 15 pages.

* cited by examiner

*Primary Examiner* — Terrell S Johnson
(74) *Attorney, Agent, or Firm* — Slater Matsil, LLP

(57) ABSTRACT

A method includes protecting a boot sequence of a processing device by incrementing a counting value generated by a monotonic counter, then a first time period after the beginning of the boot sequence, comparing, by the protection circuit, the counting value with a first reference value, and, if the counting value is smaller than the first reference value, changing, by the protection circuit, the counting value to the first reference value.

20 Claims, 7 Drawing Sheets

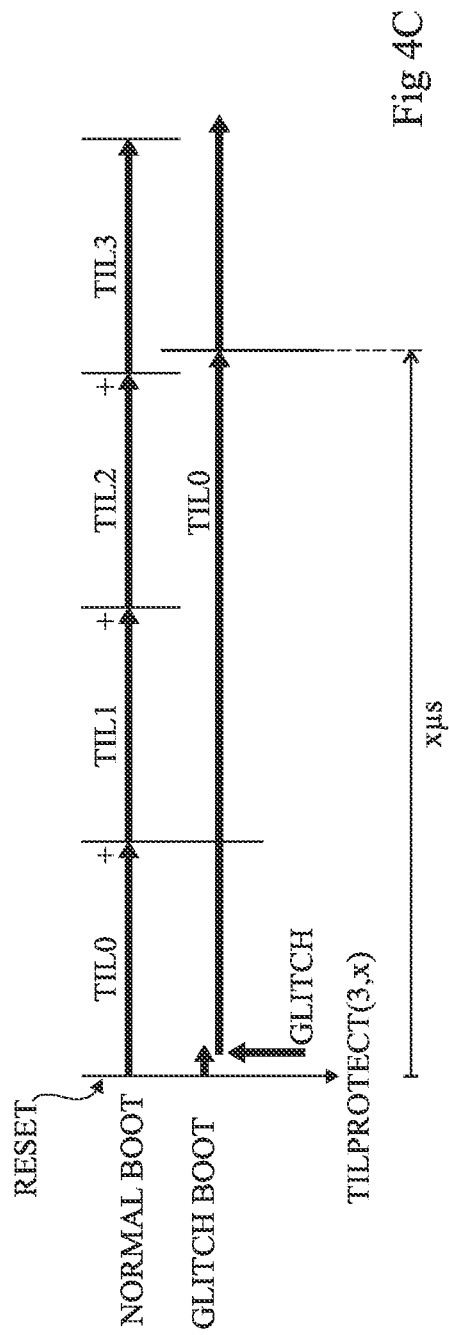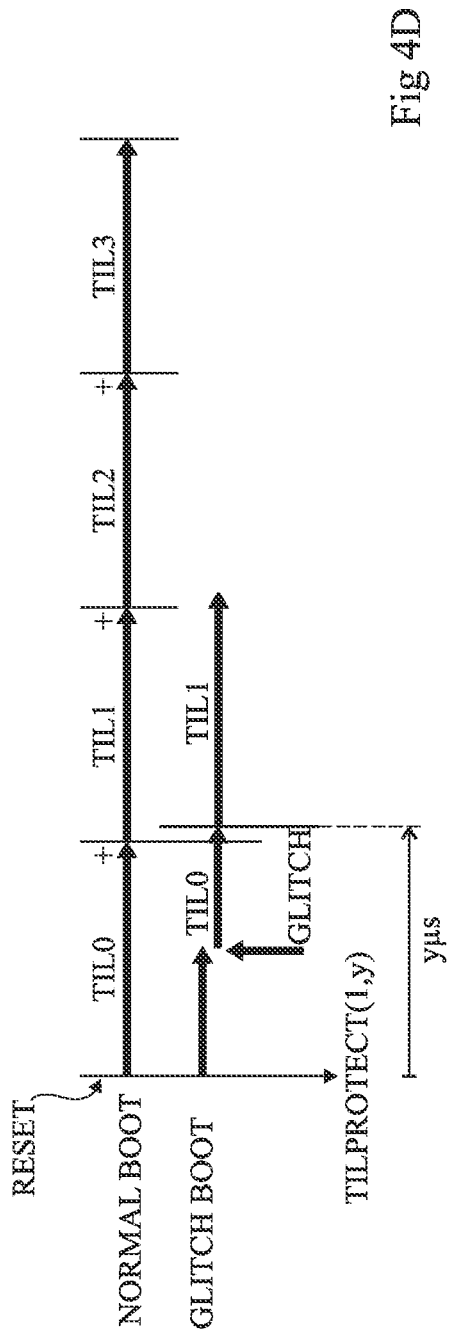

PROCESSING DEVICE AND METHOD FOR SECURED BOOT

CROSS-REFERENCE TO RELATED APPLICATIONS

This application claims the priority benefit of French patent application number FR2108928, filed on Aug. 26, 2021, entitled "Démarrage sécurisé d'une unité de traitement," which is hereby incorporated herein by reference to the maximum extent allowable by law.

TECHNICAL FIELD

The present disclosure concerns the field of methods and devices for the security of electronic circuits, and in particular a device and a method enabling achieving a secure booting of such a circuit.

BACKGROUND

The booting of a processing device is based on the execution of codes such as software and/or firmware codes. The boot sequence of a device is a critical step in terms of security, since it generally implies the setting of the parameters linked to the security of the device and/or the processing of data critical in terms of confidentiality, integrity, and authenticity such as cipher keys.

Although there exist solutions to make the boot codes immutable and less sensitive to external attacks, it would be desirable to further protect the access to these codes and to the critical data during the booting of a processing device.

SUMMARY

An embodiment overcomes all or part of the disadvantages of existing solutions.

An embodiment method comprises protecting a boot sequence of a processing device by incrementing a counting value generated by a monotonic counter, then a first time period after the beginning of the boot sequence, comparing, by the protection circuit, the counting value with a first reference value, and, if the counting value is smaller than the first reference value, changing, by the protection circuit, the counting value to the first reference value.

According to an embodiment, the counting value is stored in a register of the monotonic counter, and changing the counting value to the first reference value comprises overwriting the counting value with the first reference value in the register.

According to an embodiment, the method further comprises comparing, by the protection circuit, a current value of a hardware counter rated by a reference clock with a threshold value to determine whether the first time period has been reached.

According to an embodiment, the method further comprises deactivating the protection circuit when the first time period has been reached.

According to an embodiment, the method comprises, after a second time period, comparing, by the protection circuit, the counting value with a second reference value, and, if the counting value is smaller than the second reference value, changing, by the protection circuit, the counting value to the second reference value.

According to an embodiment, the method further comprises generating the counting value by the monotonic counter during a first phase of the boot sequence.

According to an embodiment, the method comprises transmitting, by the monotonic counter, the counting value to a circuit for controlling the access to a memory, and reading, based on the counting value, first data stored in the memory.

According to an embodiment, the reading of the first data is forbidden by the access control circuit on the basis of the first reference value.

According to an embodiment, the first data comprise first boot codes.

According to an embodiment, the method further comprises reading, based on the counting value, second data stored in the memory.

An embodiment processing device comprises a monotonic counter configured to protect a boot sequence of the device by incrementing a counting value, and a protection circuit configured to, a first time period after a beginning of the boot sequence, compare the counting value with a first reference value, and, if the counting value is smaller than the first reference value, change the counting value to a first reference value.

According to an embodiment, the protection circuit is further configured to compare a current value of a hardware counter, rated by a reference clock, and a first threshold value to determine whether the first time period has been reached.

According to an embodiment, the protection circuit is configured to be deactivated when the first time period has been reached.

According to an embodiment, the monotonic counter is configured to transmit the counting value to an access control circuit, wherein the access control circuit is configured to control access to a memory, authorize reading, based on the counting value, first data stored in the memory, and not authorize reading the first data based on the first reference value.

According to an embodiment, the access control circuit is further configured to authorize reading second data stored in the memory based on the counting value.

BRIEF DESCRIPTION OF THE DRAWINGS

The foregoing features and advantages, as well as others, will be described in detail in the following description of specific embodiments given by way of illustration and not limitation with reference to the accompanying drawings, in which:

FIG. 4C is a timing diagram showing another example of the sequence of operations of a secure booting of a processing device according to an example of embodiment of the present description;

FIG. 4D is a timing diagram showing another example of the sequence of operations of a secure booting of a processing device according to an example of embodiment of the present description;

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the design of the processing devices is well known by those skilled in the art and certain elements have not been detailed in the following description.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1A:
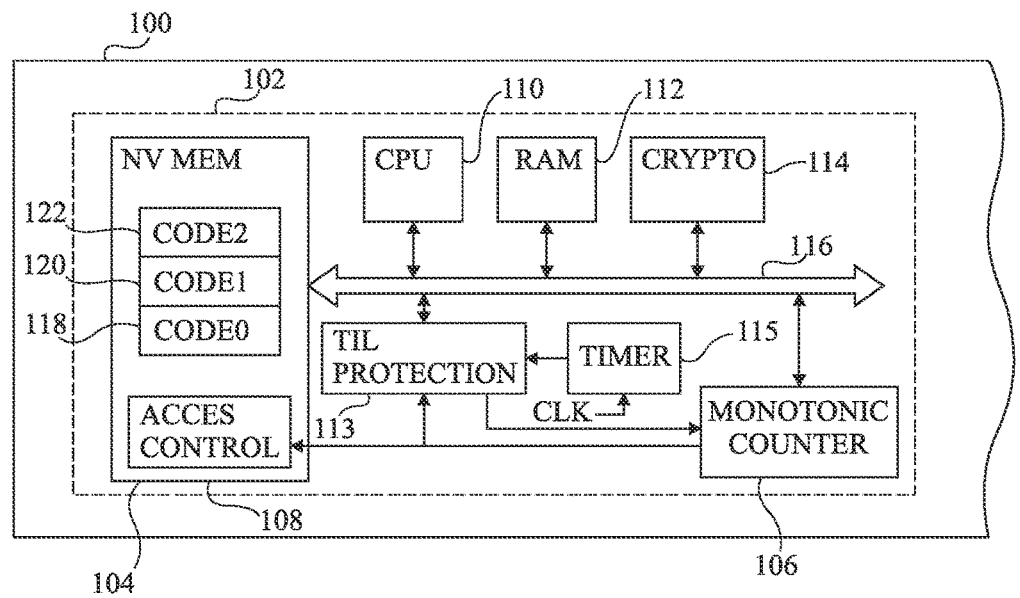
FIG. 1A schematically shows in the form of blocks an embodiment of a processing device according to an embodiment of the present description.

FIG. 1A schematically shows in the form of blocks an electronic device 100 comprising a processing device 102 according to an embodiment of the present description.

Electronic device boo is for example an electronic board such as a microcircuit card, computer equipment, or a microprocessor of microcontroller circuit.

Processing device 102 for example comprises a non-volatile memory 104 (NV MEM), for example, a flash memory. Memory 104 for example comprises an access control interface 108 (ACCESS CONTROL) coupled to a monotonic counter 106 (MONOTONIC COUNTER).

Monotonic counters are known in the state of the art, an example of such a counter being described in publication "Virtual Monotonic Counters and Count-Limited Objects using a TPM without a Trusted OS" of L. F. G. Sarmenta, M. Van Dijk, C. W. O'Donnell, J. Rhodes, and S. Devadas, and in particular in part 3 of this document. This document describes embodiments of a counter implemented in hardware and/or software form. Monotonic counter 106 is for example implemented in hardware form by a digital circuit, such as an application specific integrated circuit (ASIC). The monotonic counter is configured to maintain a counting value, accessible on an output of the counter. Following an incrementation instruction, the monotonic counter 106 increases by one or a plurality of units its counting value but, following each incrementation, the operation is not reversible. Indeed, monotonic counter 106 is configured so that its counting value never decreases. Further, between two incrementations, the counting value is for example protected against any decrease. Only the incrementation instruction or a modification instruction enables replacing the current value with a new value greater than the actual value.

Monotonic counter 106 is configured so that no instruction, apart for a resetting of processing device 102, enables returning to the previous counting value. In the case where the counting value is stored in volatile fashion, each powering off of processing device 102 generates the loss of the counting value and at each powering back on of the device, monotonic counter 106 generates an initial counting value again. In the case where the counting value is stored in a non-volatile storage element, at each reboot, an initial counting value is for example rewritten into the non-volatile storage element of monotonic counter 106. The counting value is for example stored in a register (not shown) of monotonic counter 106.

Monotonic counter 106 is, further, coupled, to a protection circuit 113 (TIL PROTECTION). For example, protection circuit 113 implements a watchdog function. Watchdog functions are known in the state of the art and are used, for example, to ensure that a processing circuit does not remain blocked at a specific step of the processing that it is carrying out. In the embodiments of the present description, the watchdog function is used to decrease the risk for monotonic counter 106 to remain blocked at a given counting value. Protection circuit 113 is for example coupled to a counter 115 (TIMER). Timer 115 contains a current value incremented by a clock signal CLK. Signal CLK is generated, for example, by a clock generator (not shown) of device 102, such as a quartz oscillator.

Processing device 102 further comprises a generic processor 110 (CPU). For example, generic processor 110 is coupled via a bus 116 to monotonic counter 106 as well to a RAM (random access memory) 112 and to non-volatile memory 104. Memory 112 and/or memory 104 for example store instructions in order to control processor 110. Generic processor 110 is further coupled via bus 116 to a cryptographic processor 114 (CRYPTO). Cryptographic processor 114 receives, via bus 116, ciphered data and returns the deciphered data and/or receives, via bus 116, non-ciphered data and returns the ciphered data.

Non-volatile memory 104 for example stores a plurality of boot codes and/or other data, which are associated with a plurality of temporal isolation levels TIL. The boot codes are for example software and/or firmware codes. In the example of FIG. 1A, non-volatile memory 104 comprises a first area 118 having a first boot code and/or first data (CODE0) stored therein. Memory 104 further comprises a second area 120, having a second boot code and/or second data (CODE1) stored therein, as well as a third area 122 having a third boot code and/or third data (CODE2) stored therein. The first, second, and third boot codes and/or data are for example associated with three corresponding TIL isolation levels. Although the case of three sets of data is illustrated in FIG. 1A, in other embodiments, non-volatile memory 104 may only store two sets of data, or more than three sets of data, in corresponding areas. As an example, the first, second, and third data comprise first, second, and third boot codes.

The TIL isolation level depends on the counting value generated by monotonic counter 106. In an example, the TIL value is equal to the counting value of monotonic counter 106, although it would be possible to modify the counting value to generate the TIL value.

During a booting, the reading of the first, second, and third codes and/or data and/or the execution of the first, second, and third boot codes are carried out by steps, each step being associated with a corresponding isolation level. The access control circuit 108 of memory 104 is configured so that the reading of these codes/data is controlled according to the isolation level of the step. The first data and/or the first code are for example associated with isolation level, or TIL value, 0 and access control circuit 108 is configured so that these data and/or code are only accessible to be read when the current counting value TIL is equal to 0. When the counting value is incremented, for example following the execution of the first code, access control circuit 108 locks area 118, the first data and/or the first code are then no longer accessible to be read. Following an incrementation, the current counting value for example switches to 1 and the data and/or the boot codes associated with isolation level 1, for example, the second boot code, are executed.

In certain cases, access control circuit 108 is configured to enable to read one or a plurality of data associated with isolation levels greater than that of the current TIL value. For example, in certain embodiments, the lower the isolation level, the higher the protection level. Isolation level 0 thus is the level ensuring the highest protection, since the corresponding data can only be read when the counting value is equal to 0. Thus, each isolation level corresponds to a level of protection of the content of the memory areas associated therewith.

The access control mechanism implemented by circuit 108 may be implemented in several ways.

In a first example, when circuit 108 receives a read request associated with one or a plurality of addresses in memory 104, it is configured to compare this/these address(es) with the address ranges associated with the areas 118, 120, 122 of memory 104. If it is an address in an area associated with a TIL value smaller than the current value, circuit 108 is for example configured to block the read operation.

In a second example, circuit 108 is configured to deactivate a circuit for reading from any area 118, 120, 122 of memory 104 associated with a TIL value smaller than the current value. For example, one or a plurality of logic gates, such as OR gates or AND gates, are coupled in the output path of each area 118, 120, and 122 of memory 104 and also receive an activation signal generated on the basis of the TIL value enabling selectively deactivating each output path.

The fact that the counting value cannot be decremented during the operating period of device 100 enables protecting the boot codes once their execution is completed, since access control circuit 108 prevents the reading of the data and/or the execution of the codes associated with isolation levels TIL smaller than the current level.

In certain embodiments, one or a plurality of the data and/or boot codes and the associated isolation levels are reserved to phases of parameterization of device 102 or to distinct entities in the chain leading from the manufacturer to the final user. For example, an intermediate entity between the manufacturer of processing device 102 and the final user of electronic device 100 may have to install data and/or boot codes which are specific to the use of device 100. In this case, one or a plurality of the "lowest" data and/or boot codes, for example, associated with isolation level 0, are for example reserved to the manufacturer of processing device 102, and other data and/or boot codes are reserved to the intermediate entity.

Figure 2:
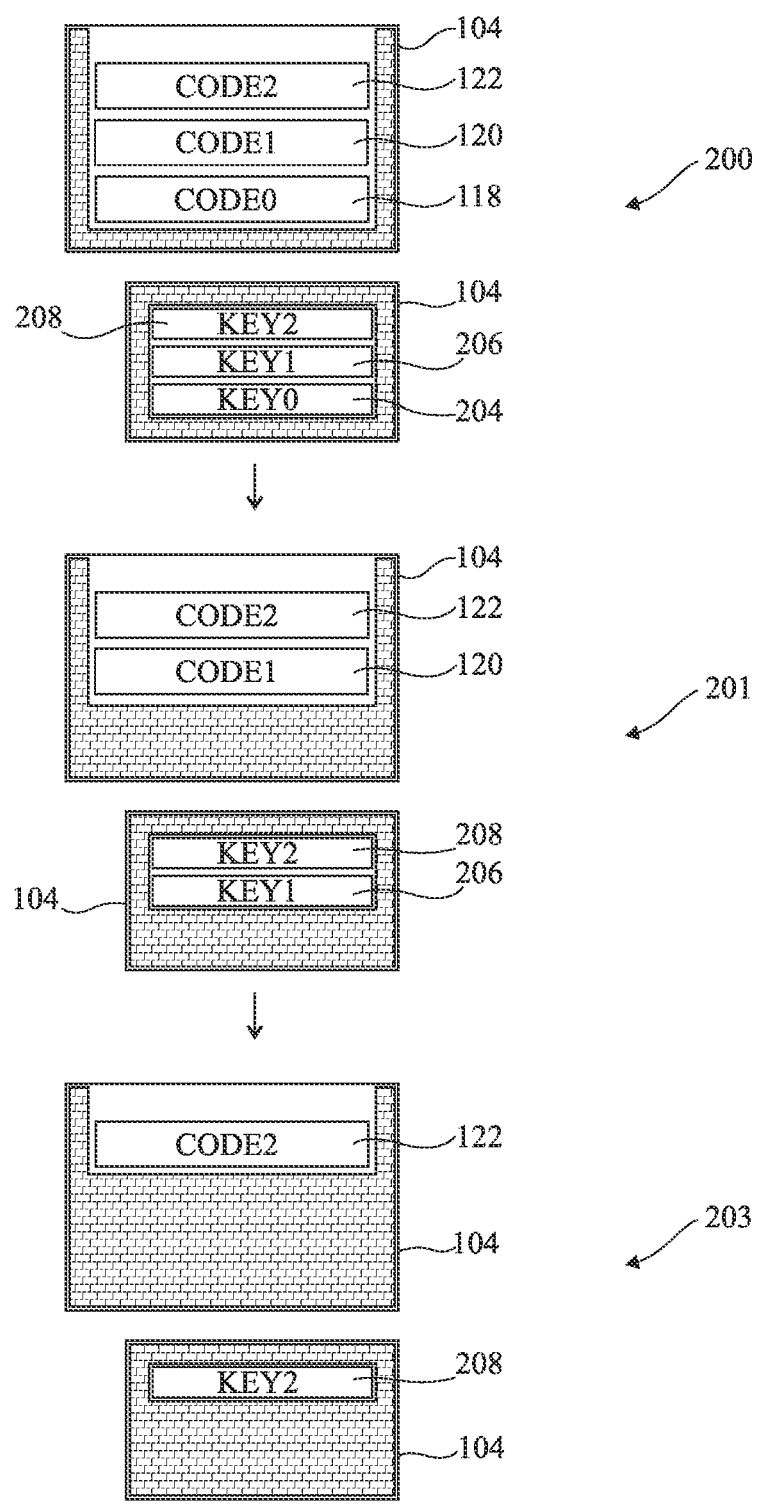
FIG. 2 shows data and codes accessible during a secure boot according to an embodiment of the present description.

The content of memory areas 118, 120, and 122 comprises, in certain embodiments, other data in addition to the boot codes of processing device 102. For example, other data critical in terms of confidentiality are stored in association with at least one of the first, second, and third codes and/or data. For example, these other data comprise cipher keys used on execution of the boot codes associated therewith. In the example of FIG. 2, memory areas 204, 206, and 208 store critical data respectively associated with the boot codes 118, 120, and 122 stored in non-volatile memory 104. Areas 204, 206, and 208 are for example areas distinct from areas 118, 120, and 122, but remain associated with an isolation level corresponding to that of the boot codes having the data linked thereto. These critical data for example include one or a plurality of cipher keys stored in each area 204, 206, and 208 and each of these areas is contained in non-volatile memory 104. According to another embodiment, each area 204, 206, and 208 is a sub-area of the corresponding area 118, 120, and 122.

Although the protections provided by monotonic counter 106 and access control circuit 108 enables securing the boot sequence in most cases, there remains a risk of glitch attack, described in further detail hereafter.

For example, if a glitch attack is carried out when the TIL value is equal to 0, there risks being possible to set the TIL value at this level, and the attacker would thus have access to the data and/or codes associated with TIL value 0 at any moment in the lifetime of device 100.

To counter this type of attack, at each booting of device 102, protection circuit 113 is for example configured to automatically force the TIL value to be equal to a given value after a predetermined time period after the beginning of the boot sequence.

Figure 1B:
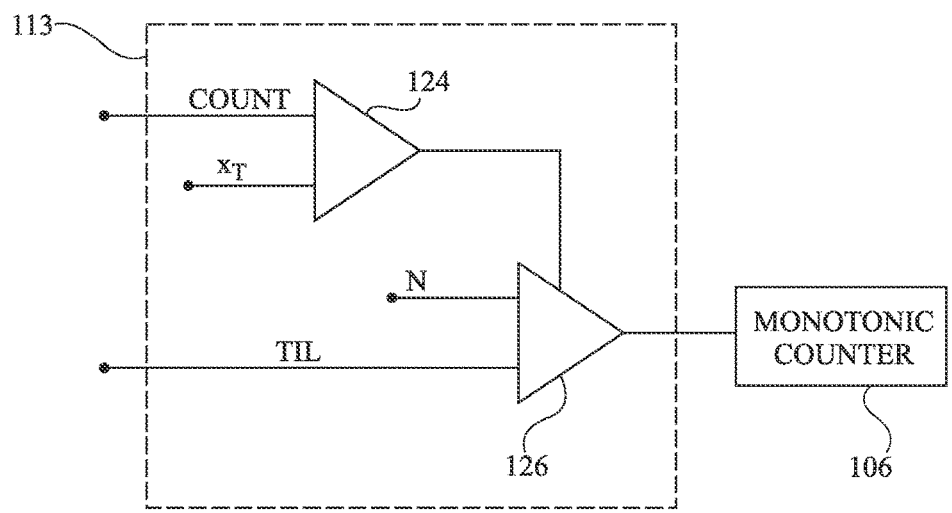
FIG. 1B schematically shows a protection circuit according to an embodiment of the present description.

FIG. 1B schematically shows an embodiment of the protection circuit 113 of the electronic device 100 of FIG. 1A according to an embodiment of the present description.

As an example, protection circuit 113 comprises comparators 124 and 126. Comparator 124 receives a signal corresponding to a current value COUNT of the counting value generated by timer 115 and compares it with a threshold value xT. Threshold value xT for example represents a reference time period. This comparison is for example performed continuously or at each cycle of the clock, until value COUNT is greater than or equal to value xT. When value COUNT is greater than or equal to xT, a comparison by comparator 126 is for example triggered. Comparator 126 compares the current TIL value of monotonic counter 106 with a reference value N. Reference value N corresponds to the TIL value which should be current after the reference time period, corresponding to xT, after the beginning of a boot sequence.

If the TIL value received by comparator 126 at the time of the comparison is smaller than reference value N, comparator 126 transmits a signal to monotonic counter 106, triggering, for example, one or a plurality of incrementations of monotonic counter 106, so that the TIL value becomes equal at least to reference value N. Reference value N is then transmitted to access control circuit 108, which results in forbidding the access to the data of the memory associated with TIL values smaller than N.

According to another embodiment, comparator 126 sends reference value N to monotonic counter 106 to force the change of the TIL value to this reference value N. To avoid the overwriting of the counting value with a lower value, monotonic counter 106 is for example configured to forbid the overwriting of its current value by a lower value.

FIG. 2 shows an example of the data and codes accessible during a secure booting of the processing device 102 of FIG. 1A according to an embodiment of the present description.

During a first step 200 of booting of processing device 102 illustrated at the top of FIG. 2, the current counting value is for example equal to 0. In the example of FIG. 2, an isolation level 0 is associated with a first code (CODE0) as well as with first critical data (KEY0) Access control circuit 108 is configured, for example, so that this first code and these first data are exclusively accessible when the current counting value is equal to 0. However, during step 200, the access control circuit for example authorizes the access to all memory areas 204, 206, and 208, as well as to all areas 118, 120, and 122. Indeed, in certain cases, for example, to anticipate next steps in the booting method, one or a plurality of the other boot codes CODE1, CODE2 are accessible to be read during step 200.

For example, once the first code (CODE0) has been executed, generic processor no controls a first incrementation of the current counting value by monotonic counter 106. For example, the first code comprises an instruction requesting the incrementation of the counter. This instruction is for example transmitted to a control register (not illustrated) of monotonic counter 106.

After this first incrementation, the current counting value of monotonic counter 106 is for example, equal to 1, corresponding to the second step 201 of the booting. Access control circuit 108 receives the new current counting value, and is configured to prevent, on the basis of this counting value greater than 0, any access to the first code as well as to the first data which are associated with isolation level 0. In other words, memory areas 118 and 204 are locked on the basis of any counting value greater than 0.

Isolation level 1 is associated with a second code (CODE1) contained in area 120 as well as with second data (KEY1) contained in area 202. According to an embodiment, the third code (CODE2), for example, associated with isolation level 2 and contained in area 122, is accessible to be read on the basis of the current counting value equal to 1.

For example, once the second code (CODE1) is executed, generic processor 110 controls a second incrementation of the current counting value by monotonic counter 106. For example, after this second incrementation, the current counting value of monotonic counter 106 is equal to 2, corresponding to the third step 203 of the booting. Isolation level 2 is associated with the third code (CODE2) as well as with third data (KEY2). Access control circuit 108 receives the new counting value, and is configured to prevent, on the basis of this counting value greater than 1, any access to the first and to the second code as well as to the first and to the second data which are associated with isolation levels smaller than or equal to 1.

According to an embodiment, when the last boot code is executed, for example, the third boot code, generic processor 110 controls a third incrementation of the current counting value by monotonic counter 106. Access control circuit 108 then locks any access to the first, second, and third boot codes as well as to the first, second, and third data.

According to another embodiment, when the last boot code is executed, for example, the third boot code, the current counting value is not incremented by monotonic counter 106 and the access to the third boot code as well as to the third data remains authorized by the access control circuit.

Figure 3:
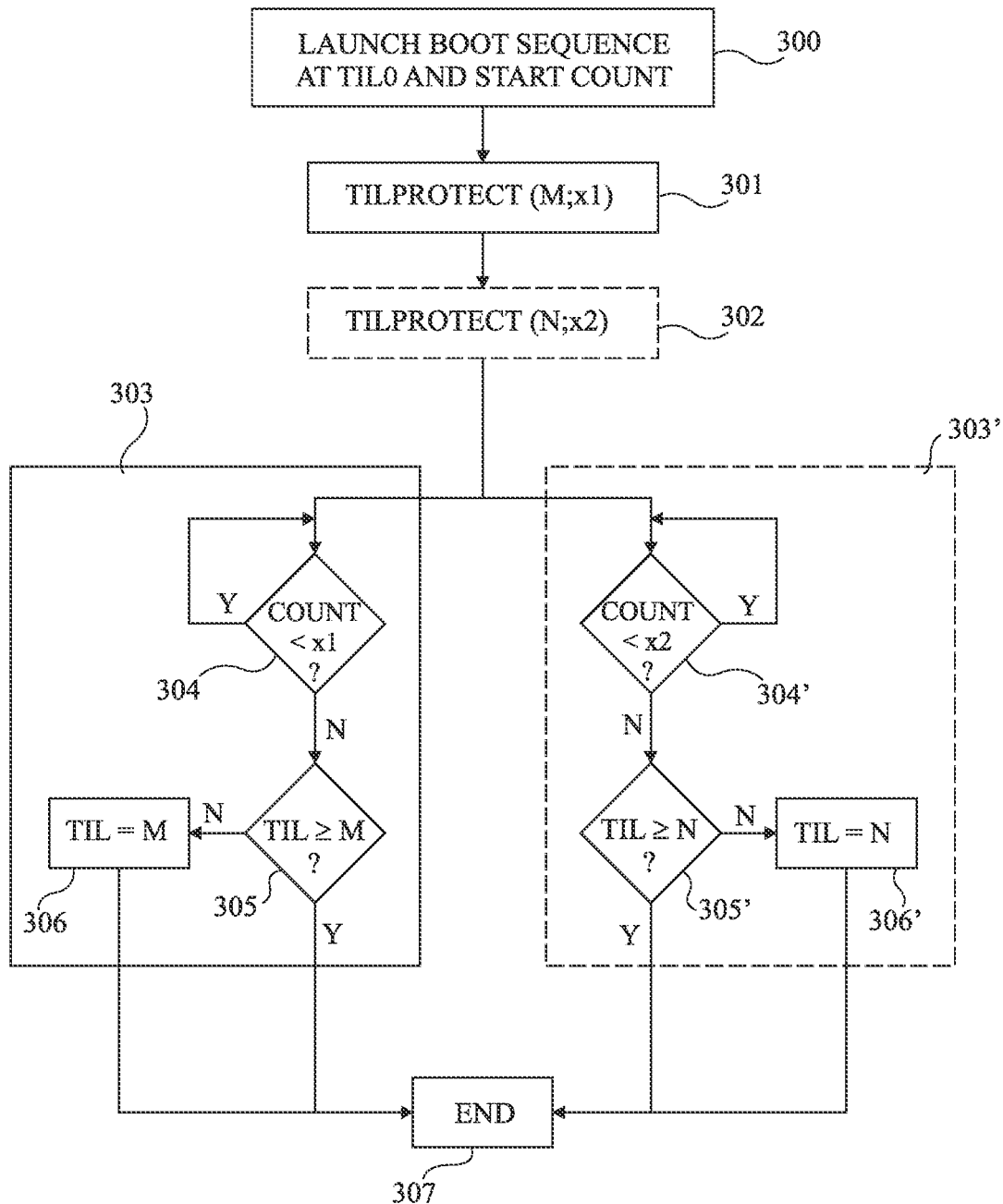
FIG. 3 is a flowchart showing operations of a method of secure booting of a processing device according to an example of embodiment of the present description.

FIG. 3 is a flowchart showing operations of a method of secure booting of processing device 102 according to an example of embodiment of the present description.

At a step 300 (LAUNCH BOOT SEQUENCE AT TIL0 AND START COUNT), device 102 is reset and a boot sequence starts. Monotonic counter 106 then generates a first TIL value, for example, equal to 0. Counter 115 is initialized and a current value COUNT of counter 115 is incremented at each cycle of the clock of device 102.

In certain cases, in an operation 301 (TILPROTECT(M; x1)), protection circuit 113 is configured to trigger the incrementation of the TIL value to value M, a time period x1 after the beginning of the boot sequence. For example, this operation 301 comprises the configuration of a reference value M and of a threshold value x1 in a register. In other embodiments, these values are invariable and non-volatilely stored in a memory of device 100.

Optionally, in an operation 302 (TILPROTECT(M;x2)), protection circuit 113 may also be configured to trigger the incrementation of the TIL value to value N, a time period x2 after the beginning of the boot sequence. In the same way as for operation 301, operation 302 for example comprises the configuration of a reference value N and of a threshold value x2 in a register. In other embodiments, these values are invariable and non-volatilely stored in a memory of device 100.

The protection methods based on one or a plurality of time periods xT are for example implemented in parallel, FIG. 3 illustrating an example of a first method 303 based on time period x1, and of a second method 303' based on time period x2.

Method 303 comprises steps 304 to 306.

At a step 304 (COUNT<x1?), the comparator 124 of protection circuit 113 compares the current value COUNT of counter 115 with value x1. If value COUNT is smaller than value x1 (branch Y), the method resumes on this same step 304. If value COUNT is greater than or equal to value x1 (branch N), comparator 126 compares the current TIL value of monotonic counter 106 with value M (block 305, TIL≥M). If the current TIL value is greater than or equal to value M, the method ends at a step 307 (END). In the case where the current TIL value is smaller than value M, the TIL value is forced to value M in an operation 306. For example, either the counting value of monotonic counter 106 is incremented by one or a plurality of units until the TIL value is equal to value M, or the current TIL value is overwritten in the register of monotonic counter 106 with value M. After operation 303, the method ends at step 307 (END).

In certain cases, only method 303 is implemented. As an example, in a normal use, that is, with no glitch attack, TIL value 2 is for example reached within less than 5 microseconds following the launching of the boot sequence. Protection circuit 113 is then only configured to automatically trigger the incrementation of the TIL value to value 2, 5 microseconds after the beginning of the boot sequence. In the case where the TIL value is already equal to 2, protection circuit 113 is for example deactivated.

In the case where method 303' is also implemented, in parallel with method 303, method 303' comprises operation 304', 305', and 306' similar to operations 304, 305, and 306, except that threshold value x1 is replaced with threshold value x2 in operation 304', and reference value M is replaced with reference value N in operations 305' and 306'. The comparisons made in operations 304' and 305' are for example implemented by another circuit similar to that of FIG. 1B.

As an example, in the case where methods 303 and 303' are implemented, the protection circuit is then configured to automatically trigger the incrementation of the TIL value to value 2, for example, 5 microseconds after the beginning of the boot sequence, and in parallel to automatically trigger the incrementation of the TIL value to value 3, for example, 10 microseconds after the beginning of the boot sequence. Protection circuit 113 is for example deactivated as soon as the current TIL value is equal to 3.

It is possible to protect a plurality of TIL levels by carrying out a plurality of steps similar to steps 304 to 306 and to steps 304' to 306' with reference values different from the values M and N associated with values different from x1 and x2.

FIGS. 4A to 4D are timing diagrams illustrating an example of the sequence of operations of a secure booting of processing device 102.

FIGS. 4A to 4D each show two temporal lines representing the sequence of operations of a booting from the resetting (RESET) of device 102. The upper line (NORMAL BOOT) of FIGS. 4A to 4D corresponds to the launching of a boot sequence in the absence of a glitch attack. The initial TIL value is 0, and this value is incremented three times during the boot sequence.

In the example of FIGS. 4A to 4D, during a glitch-free booting, TIL value 1 is reached within less than y microseconds and TIL value 3 is reached within less than x microseconds.

The lower lines of FIGS. 4A to 4D each show an example of a booting of device 102 in the present of a glitch attack (GLITCH BOOT).

Figure 4A:
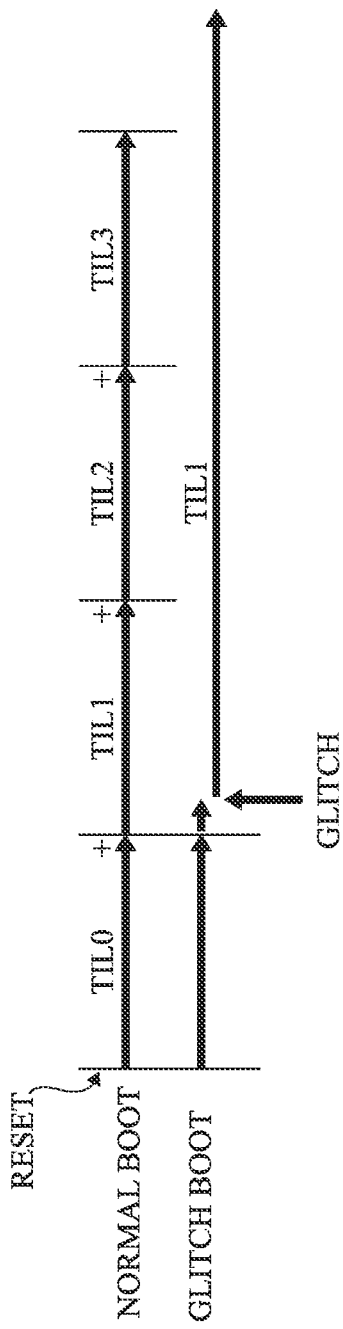
FIG. 4A is a timing diagram showing an example of the sequence of operations of a secure booting of a processing device.

The lower line of FIG. 4A shows an example of a booting of device 102 undergoing a glitch attack (GLITCH) when the TIL value is equal to 1. In this example, the incrementation (+) of the TIL values is no longer applied after the arrival of the glitch, and the TIL value thus remains set at 1. The boot sequence is then carried out while keeping 1 as a TIL value. The attacker then has access to the data associated with TIL value 1 even when the boot sequence is over.

Figure 4B:
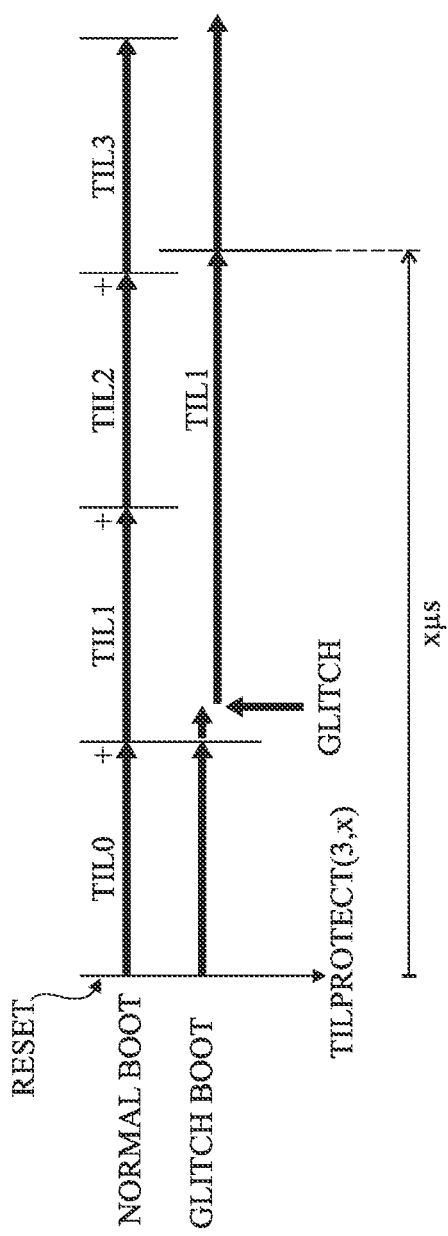
FIG. 4B is a timing diagram showing an example of the sequence of operations of a secure booting of a processing device according to an example of embodiment of the present description.

The lower line of FIG. 4B shows an example of booting of device 100 illustrating an implementation mode of the described method. In this example, protection circuit 113 is configured (TILPROTECT(3,x)) to force the TIL value to be equal to 3 after a time period of x microseconds following the beginning of the boot sequence. In this example, a glitch attack occurs when the TIL value is equal to 1. The boot sequence continues and the TIL value is not incremented to value 2. A time period of x microseconds after the beginning of the boot sequence, protection circuit 113 forces the TIL value to be equal to value 3. The data and/or codes associated with TIL values 1 and 2 are then no longer accessible by the attacker.

The lower line of FIG. 4C shows an example of booting of processing device 102 similar to that of FIG. 4B. In the example of FIG. 4C, protection circuit 113 is configured in the same way as in FIG. 4B. In the example of FIG. 4C, a glitch attack (GLITCH) is carried out when the TIL value is still equal to 0. TIL values 1 and 2 being unprotected, the boot sequence continues while keeping 0 as a TIL value. A time period of x microseconds after the beginning of the boot sequence, protection circuit 113 forces the TIL value to be equal to value 3. The data and/or codes associated with TIL values 0, 1 and 2 are then no longer accessible by the attacker.

The lower line of FIG. 4D shows an example of booting of processing device 102 for which protection circuit 113 is configured (TILPROTECT(1,y)) to force the TIL value to be equal to 1 after a time period of y microseconds following the beginning of the boot sequence. In the example of FIG. 4D, a glitch attack (GLITCH) is carried out when the TIL value is still equal to 0. However, the incrementation of the TIL value to value 1 is ensured by protection circuit 113, after a time period of y microseconds following the beginning of the boot sequence.

In the example of FIG. 4D, it is possible to add the protection implemented in FIGS. 4B and 4C to ascertain that at the end of the boot sequence, the TIL value is effectively equal to 3.

Figure 5:
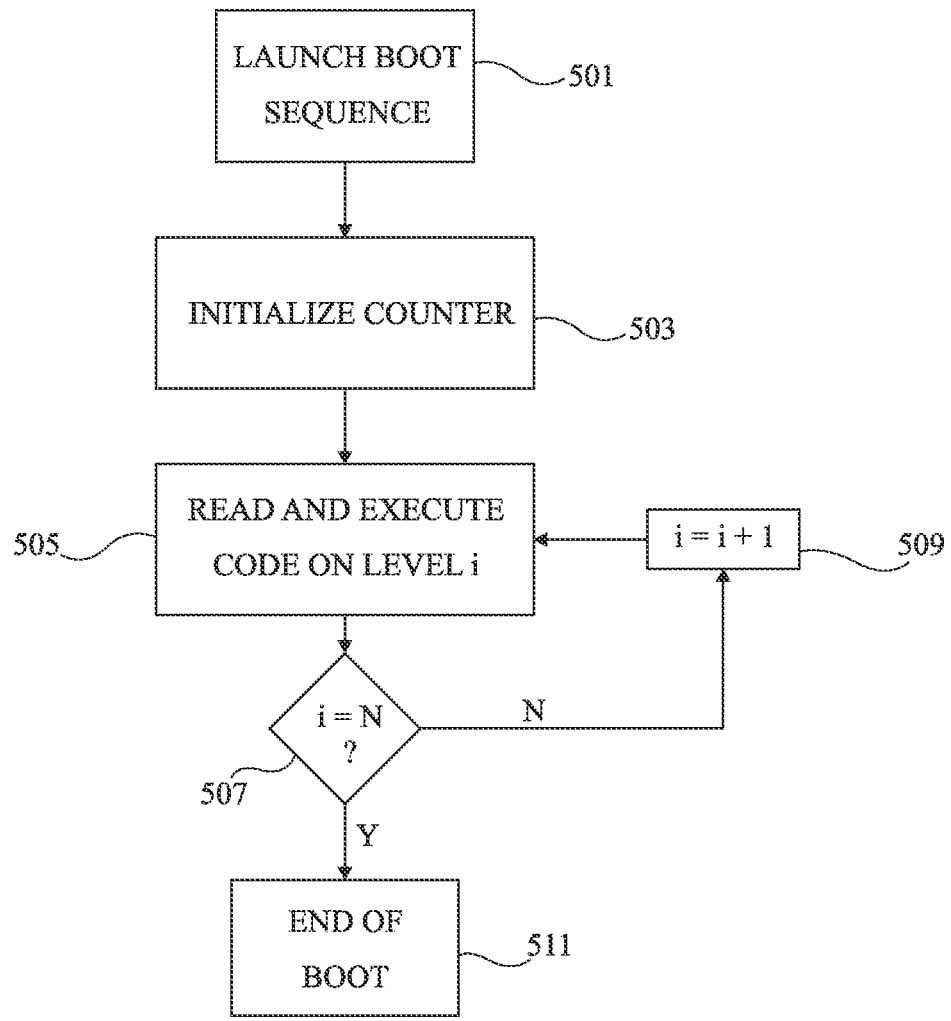
FIG. 5 is a flowchart showing operations of a method of secure booting of a processing device according to an example of embodiment of the present description.

FIG. 5 is a flowchart showing operations of a method of secure booting of processing device 102 according to an example of embodiment of the present description. This method is implemented for example by the generic processor 110, the monotonic counter 106, and the access control circuit 108 of the processing device 102 of FIG. 1A.

At a step 501 (LAUNCH BOOT SEQUENCE), processing device 102 is booted. In an example, it is the first booting of device 102 after its production. In another example, it is a booting performed by an intermediate entity between the manufacturer of device 102 and its final user. Still in another example, it is a so-called operation booting of the electronic device 100 performed by the final user.

At a step 503 (INITIALIZE COUNTER), subsequent to step 501, monotonic counter 106 is initialized at an initial value, being a natural integer. In the example where the counting value is volatilely stored, each powering-on of processing device 102 generates the initialization of the counting value, for example, at 0 or 1. In another example where the counting value is stored in non-volatile storage elements, each powering-on of processing device 102 generates the replacing of the current counting value by the initial counting value, for example, equal to 0 or to 1.

In certain embodiments, the initial counting value generated after a powering-on may vary according to the state, or context, of processing device 102. For example, one or a plurality of counting values correspond to one or a plurality of isolated levels reserved to an initial parameterizing phase of device 102, for example comprising the installation of firmware. The data and/or codes associated with these isolation levels are for example used for this initial parameterizing.

For example, after the manufacturing, processing device 102 has the "blank" context and the initial counting value is equal to a value reserved for parameterization, such as 0. Once the parameterizing is over, the context of the device for example becomes "parameterizing complete". With this new context, the powering-on of device 102, for example performed by an intermediate entity between the manufacturer and the final user and/or by the final user, will then trigger a counting value greater than the reserved counting value, and for example equal to 1. The boot code(s), as well as the critical data, associated with the isolation level corresponding to he reserved counting value will accordingly be inaccessible.

For example, the context of the device is detected by the presence of a voltage on a boot pin of the device, this voltage being applied for example by the addition of a jumper between the boot pin and another pin at a power supply voltage. AS a complement or as a variant, the context of the device is detected by the value of one or a plurality of bits non-volatilely stored, in protected fashion, in memory 104, or in another memory.

In an example, generic processor 110 is arranged to detect the context of device 102 at the powering-on of device 102, and to accordingly configure the initial counting value of monotonic counter 106. In another example, monotonic counter 106 is arranged to itself detect the context of device 102 and to itself configure its initial counting value, at the powering-on of device 102.

At a step 505 (READ AND EXECUTE CODE ON LEVEL i), subsequent to step 503, the data and the boot codes associated with isolation level i are read by generic processor 110 and the associated boot codes at the level of isolation level i are executed. Once the codes of level i have been executed, generic processor 110 compares, at a step 507 (i=N?) counting value i with value N, N being the counting value associated with the last step in the boot sequence, in other words the boot codes of isolation level N are the last to be executed according to the embodiment of the present description. For example, in the example of FIG. 2, N is equal to 2. If i is not equal to N (branch N), the method continues at a step 509 (i=i+1) where generic processing 110 triggers the incrementation of the counting value. For example, the counting value varies from i to i+1. It is also possible for the incrementation to increase the counting value by a plurality of units. The method then resumes at step 505.

In the case where, after comparison step 507, the counting value is then equal to N (branch Y), the method ends at a step 511 (END OF BOOT) where the booting of processing device 102 ends. According to an embodiment, the current counting value remains equal to N after step 511. According to another embodiment, the counting value is incremented at step 511, and the current counting value becomes equal to N+1. In this second case, the access control circuit is then configured to prevent any access to all the boot codes on the basis of this counting value.

Figure 6:
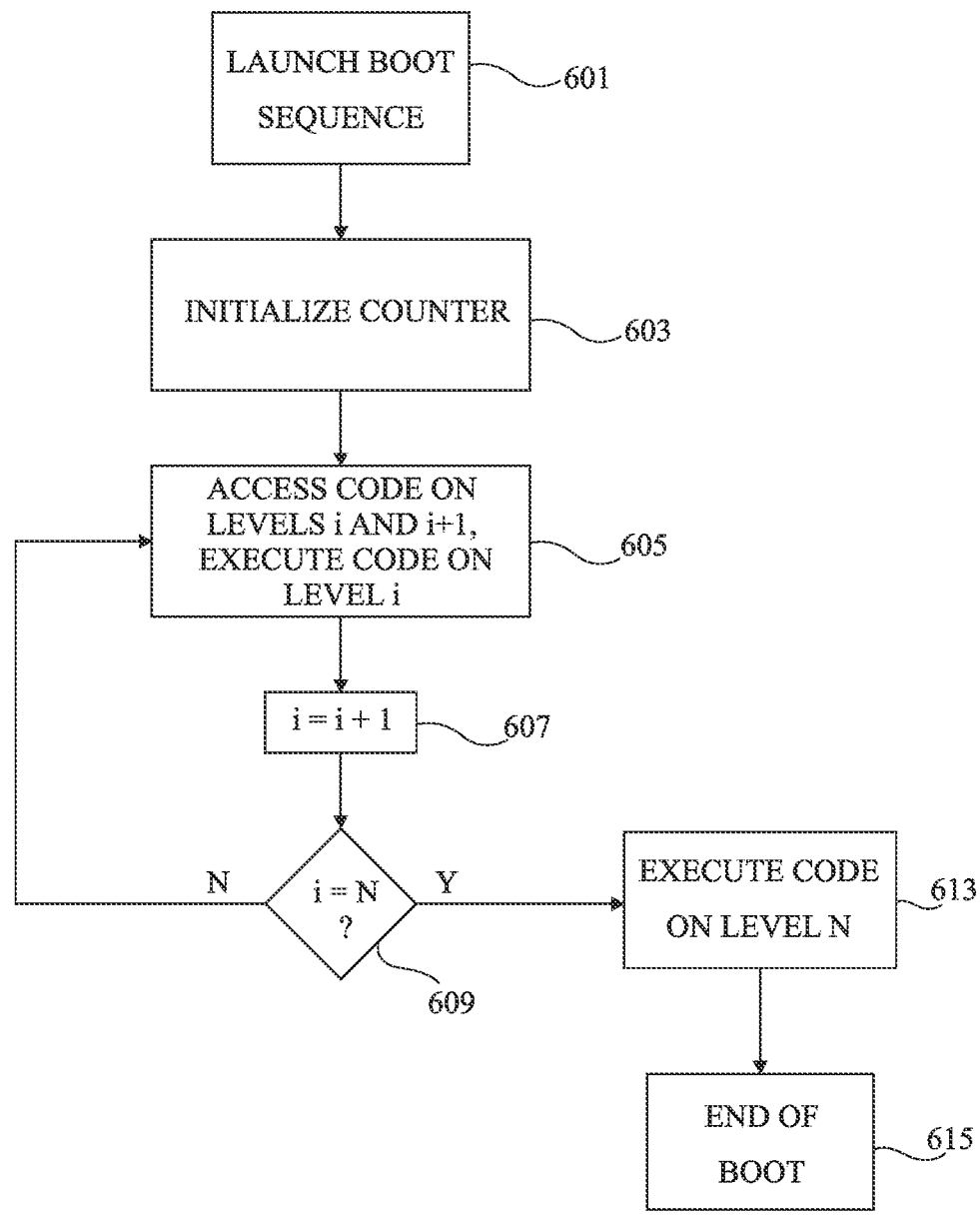
FIG. 6 is a flowchart showing operations of a method of secure booting of a processing device according to an example of embodiment of the present description.

FIG. 6 is a flowchart showing operations of a method of secure booting of a processing device 102 according to another example of embodiment of the present description. This method is implemented for example by the generic processor 110, the monotonic counter 106, and the access control circuit 108 of the processing device 102 of FIG. 1A.

Steps 601 and 603 are similar to the steps 501 and 503 of FIG. 5, and will not be described again in detail.

At a step 605 (ACCESS CODE ON LEVELS i AND i+1, EXECUTE CODE ON LEVEL i), subsequent to step 603, the data and the boot codes associated with isolation levels i+1 are accessible by generic processor 110 and the boot code(s) associated with isolation level i are executed.

In an example, the data or codes associated with isolation level i contain one or a plurality of cipher keys, ciphered or not, which will be used on execution of one or a plurality of codes associated with isolation level i+1. Thus, a write access is for example authorized on the memory area(s) associated with isolation level i+1 to provision the keys to the codes associated with isolation level i+1.

In another example, the codes associated with isolation level i contain instructions aiming at verifying the integrity of the data and/or codes associated with isolation level i+1. Thus, a read access to the memory area(s) associated with isolation level i+1 is authorized to perform this verification.

At a step 607 (i=i+1) subsequent to step 605, the counting value is incremented. For example, the counting value varies from i to i+1. In other examples, the incrementation increases i by a plurality of units.

At a step 609 (i=N?), generic processor no compares counting value i with value N, where N is defined as described in relation with step 607 of FIG. 3. If value i is not equal to N (branch N) the method returns to step 605.

In the case where, during comparison step 609, the counting value is equal to N (branch Y), the method continues at a step 613 (EXECUTE CODE ON LEVEL N) where the boot code(s) associated with isolation level N are executed.

The booting of processing device 102 ends with a step 615 (END OF BOOT) which is similar to step 511 of FIG. 5 and is not described again in detail.

The method having its implementation disclosed in FIG. 6 allows a staggered reading of the boot codes. Indeed, the boot codes associated with an isolation level are read when the counting value is smaller than the value of the level. This provides a time gain with respect to the implementation of the method disclosed in FIG. 5.

An advantage of the described embodiments is that boot codes, as well as data critical in terms of confidentiality, are significantly protected against attacks, and particularly glitch attacks, by the use of a monotonic counter and of a protection circuit such as described in the present description.

Another advantage of the described embodiments is that the mechanisms of protection of a boot sequence are ensured by hardware circuits.

Various embodiments and variants have been described. Those skilled in the art will understand that certain features of these various embodiments and variants may be combined, and other variants will occur to those skilled in the art. In particular, the number of isolation levels as well as the number of protections of the isolation levels may vary. Further, although examples of comparisons have been described on the basis of certain operators such as smaller than, or greater than or equal to, according to the definition of the threshold or reference values, the operators may vary.

Finally, the practical implementation of the described embodiments and variants is within the abilities of those skilled in the art based on the functional indications given hereabove.

What is claimed is:

1. A method comprising:
   protecting a boot sequence of a processing device by incrementing a counting value generated by a monotonic counter;
   a first time period after a beginning of the boot sequence, comparing, by a protection circuit, the counting value with a first reference value; and
   in response to the counting value being smaller than the first reference value, changing, by the protection circuit, the counting value to the first reference value.

2. The method according to claim 1, further comprising storing the counting value in a register of the monotonic counter; and
   the changing the counting value to the first reference value comprises overwriting the counting value with the first reference value in the register.

3. The method according to claim 1, further comprising comparing, by the protection circuit, a current value of a hardware counter rated by a reference clock with a threshold value to determine whether the first time period has been reached.

4. The method according to claim 1, further comprising deactivating the protection circuit in response to the first time period being reached.

5. The method according to claim 1, further comprising:
   after a second time period, comparing, by the protection circuit, the counting value with a second reference value; and in response to the counting value being smaller than the second reference value, changing, by the protection circuit, the counting value to the second reference value.

6. The method according to claim 1, further comprising generating the counting value by the monotonic counter during a first phase of the boot sequence.

7. The method according to claim 1, further comprising:
transmitting, by the monotonic counter, the counting value to an access control circuit for controlling access to a memory; and
reading, based on the counting value, first data stored in the memory.

8. The method according to claim 7, wherein reading the first data is forbidden by the access control circuit based on the first reference value.

9. The method according to claim 7, wherein the first data comprise first boot codes.

10. The method according to claim 7, further comprising reading, based on the counting value, second data stored in the memory.

11. A processing device comprising:
a monotonic counter configured to protect a boot sequence of the processing device by incrementing a counting value; and
a protection circuit configured to:
a first time period after a beginning of the boot sequence, compare the counting value with a first reference value; and
if the counting value is smaller than the first reference value, change the counting value to the first reference value.

12. The processing device according to claim 11, wherein the protection circuit is further configured to compare a current value of a hardware counter rated by a reference clock, and a first threshold value to determine whether the first time period has been reached.

13. The processing device according to claim 11, wherein the protection circuit is configured to be deactivated when the first time period has been reached.

14. The processing device according to claim 11, wherein the monotonic counter is configured to transmit the counting value to an access control circuit, wherein the access control circuit is configured to:
control access to a memory;
authorize reading, based on the counting value, first data stored in the memory; and
not authorize the reading of the first data based on the first reference value.

15. The processing device according to claim 14, wherein the access control circuit is further configured to authorize reading second data stored in the memory based on the counting value.

16. A processing device comprising:
a monotonic counter configured to protect a boot sequence of the processing device by incrementing a counting value;
a non-volatile memory comprising an access control circuit coupled to the monotonic counter;
a hardware timer coupled to a reference clock and configured to generate a current clock value;
a protection circuit coupled to the hardware timer, the monotonic counter, and the non-volatile memory, the protection circuit configured to:
compare the current clock value and a first threshold value to determine whether a first time period after a beginning of the boot sequence has been reached;
at the first time period, compare the counting value with a first reference value; and
if the counting value is smaller than the first reference value, change the counting value to the first reference value.

17. The processing device according to claim 16, wherein the protection circuit is configured to be deactivated when the first time period has been reached.

18. The processing device according to claim 16, wherein the monotonic counter is configured to transmit the counting value to the access control circuit, wherein the access control circuit is configured to:
control access to the non-volatile memory;
authorize reading, based on the counting value, first data stored in the non-volatile memory; and
not authorize the reading of the first data based on the first reference value.

19. The processing device according to claim 18, wherein the access control circuit is further configured to authorize reading second data stored in the non-volatile memory based on the counting value.

20. The processing device according to claim 16, wherein the protection circuit is further configured to:
after a second time period, compare the counting value with a second reference value; and
if the counting value is smaller than the second reference value, change the counting value to the second reference value.

* * * * *